March 29, 1966  F. GROSS  3,243,735
DELAY LINE FOR TRAVELLING WAVE TUBES
Filed Dec. 28, 1960  3 Sheets-Sheet 2

A÷B

A÷B

A÷B

March 29, 1966  F. GROSS  3,243,735
DELAY LINE FOR TRAVELLING WAVE TUBES
Filed Dec. 28, 1960  3 Sheets-Sheet 3

United States Patent Office 3,243,735
Patented Mar. 29, 1966

3,243,735
DELAY LINE FOR TRAVELLING WAVE TUBES
Franz Gross, Munich, Germany, assignor to Siemens & Halske Aktiengesellschaft, Berlin and Munich, Germany, a corporation of Germany
Filed Dec. 28, 1960, Ser. No. 78,889
Claims priority, application Germany, Apr. 1, 1960, S 67,874
8 Claims. (Cl. 333—31)

This invention is concerned with a delay line for travelling wave tubes, particularly for millimeter waves, constructed of two comblike members disposed with the teeth in facing and longitudinally staggered or displaced relationship.

So-called interdigital lines have become known as delay lines for travelling wave tubes. These interdigital lines comprise members having teeth extending alternately from two walls, thus forming two mutually oppositely disposed comblike structures. The teeth of the two comblike members are in interlacing relationship. These lines are usually coupled with a flat electron beam. The coupling with a densified circular beam requires bores in the teeth for the passage of the beam. However, in the case of very short waves, the dimensions of an interdigital line must be very small and the provision of bores causes pronounced technical difficulties.

The structural periods of a delay line must be made finer for the use thereof in connection with shorter waves. The consequence is that it is difficult to produce interdigital lines for short waves. Moreover, the coupling impedance between an interdigital line and an electron beam is in many cases insufficient to meet operational requirements.

In order to overcome these difficulties, the invention proposes, in connection with a delay line for travelling wave tubes, especially for millimeter waves, made in the manner of a double comb line, with the teeth of one comb member staggered or displaced with respect to the teeth of the other comb, to avoid overlapping of the teeth of the two comblike members.

In a line according to the invention, the conduction character of an interdigital line is substantially preserved so far as the partial waves passing over the line are concerned. The fundamental wave passes rearwardly. As compared with the interdigital line, the delay line according to the invention has a higher coupling impedance between the line and an electron beam coupled therewith. The use of a densified circular electron beam is entirely possible, since the electron beam is gunned for passage between the tips of the teeth of the comblike members. The electron beam interacts thereby reciprocally with the electrical strength component of the electrical field appearing between the tips of the teeth and oriented in the radiation direction. A considerable advantage of the travelling wave tube according to the invention resides in the fact that the teeth of the comblike members can be, with identical structural length, thicker than in the case of an interdigital line, since they need not be disposed in interlacing relationship. This results in a better heat dissipation of the line.

The foregoing and other objects and features of the invention will appear from the description which is rendered below with reference to the accompanying drawings in which like parts are similarly referenced.

Figure 1:
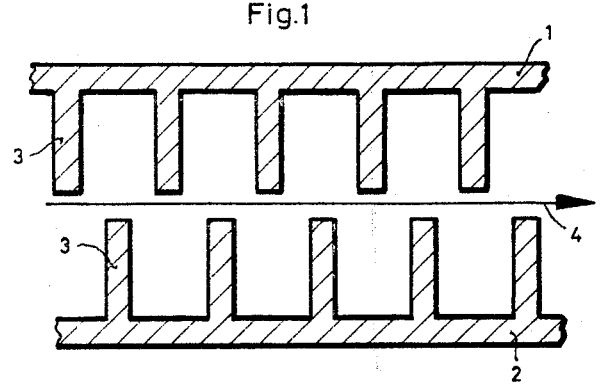
FIGS. 1, 2 and 3 show in sectional views parts of delay lines made according to the invention.

The delay line shown in FIG. 1 comprises two line members 1 and 2 having uniformly spaced comblike teeth 3. These comblike conductors are disposed in facing and mutually staggered or displaced but longitudinally not overlapping relationship. This delay line is in a travelling field tube advantageously coupled with a densified circular beam which is gunned therethrough between the tips of the teeth 3 as indicated by the arrow 4.

Figure 2:
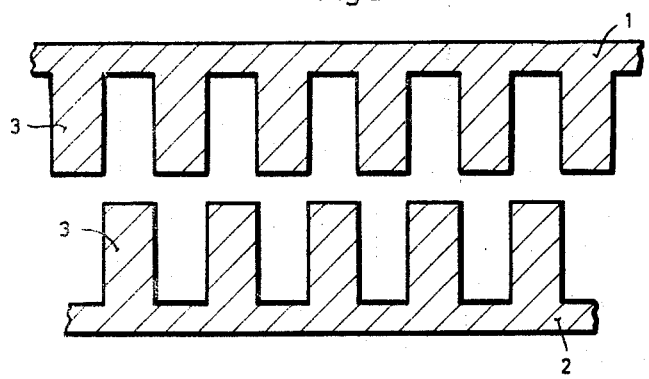

In the structure shown in FIG. 2, the dimensions of the teeth 3 correspond in longitudinal direction of the line to the spacing between any to neighboring teeth. The advantage of this constructional form resides, as compared with FIG. 1, in better heat dissipation.

Figure 3:
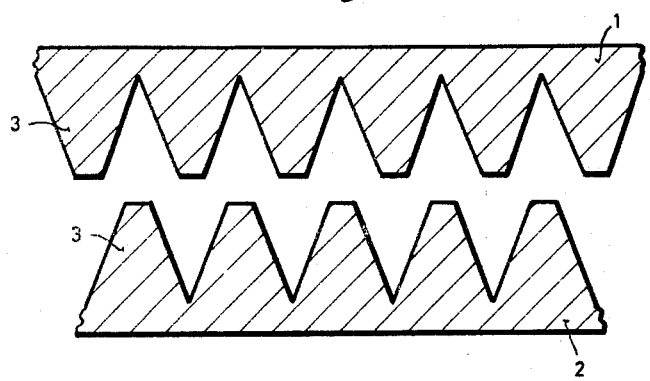

The embodiment according to FIG. 3, which is particularly adapted for highly loaded delay lines, comprises teeth of trapezoidal shape, which provide for a particularly favorable course of the electrical field.

The above described lines have a low pass filter character. Upon placing the two comblike members into a hollow conductor or wave guide with parallel envelope lines, there will result a conductor structure having band pass characteristics, that is, having in addition to its upper limit frequency which is substantially determined by the length of the teeth, also a lower limit frequency which is determined by the shape of the teeth and by the capacitance between the oppositely facing teeth tips as well as by the course of the discharge path over the marginal part of the wave guide.

Figure 5:
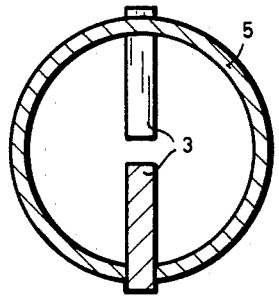
FIGS. 4, 5, 6 and 7 illustrate in sectional views parts of delay lines made in simple manner by punching operation and having band pass characteristics.
Figure 4:
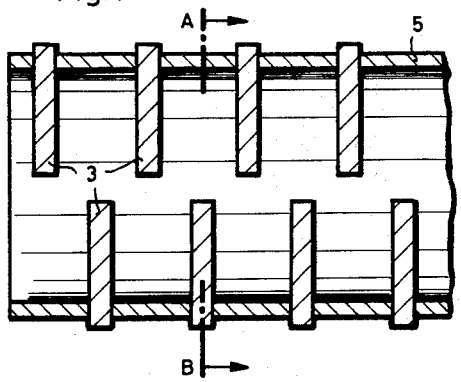
Figure 7:
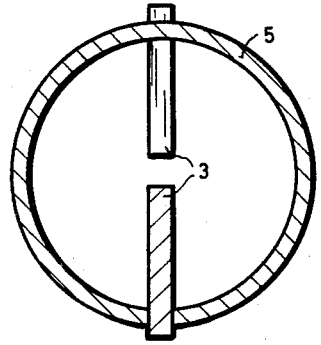
Figure 6:
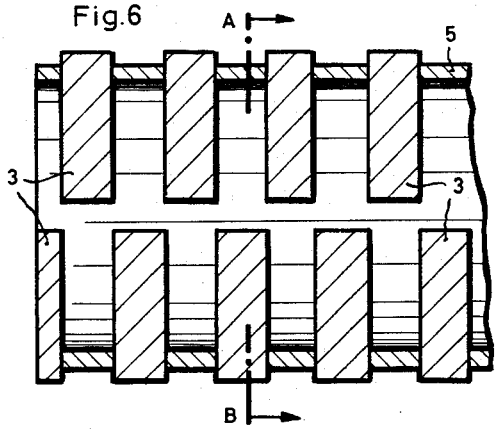

FIGS. 4 to 7 show two examples of delay lines of the type noted in the preceding paragraph, that is, having band pass characteristics, FIGS. 5 and 7 being respectively transverse sections take along lines A–B of FIGS. 4 and 6. Teeth 3 are disposed in rows at opposite points in the wall 5 of a cylindrical wave guide, the teeth of one row being in non-overlapping or non-straddling relationship staggered or displaced in longitudinal direction with respect to the teeth of the other row with the inwardly facing tips of the teeth spaced apart. In a line according to FIGS. 6 and 7, the teeth 3 are uniformly spaced apart longitudinally of the wave guide conforming to the spacing between any two neighboring teeth in a manner similar to FIG. 2.

Delay lines made respectively according to FIGS. 4, 5 and 6, 7, can be produced in simple manner, for example, by punching or stamping the two comblike members, in their defined mutual positions, from metal sheet which is soldered in place between oppositely extending walls of a wave guide.

Figure 9:
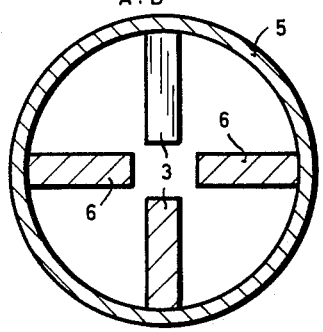
FIGS. 8 and 9 show in sectional views parts of a delay line for amplifier operation with the +1 partial wave.
Figure 8:
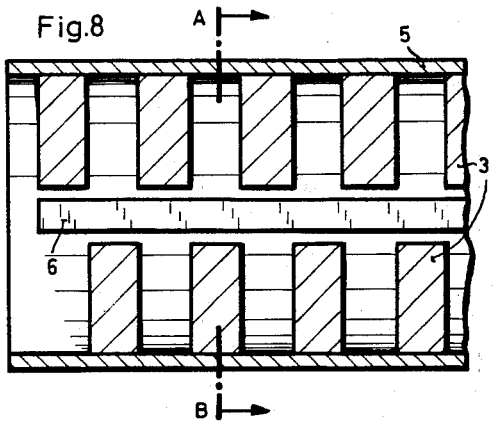

Assuming suitably shaped teeth, the dispersion of the line can be affected by insertion of longitudinal webs 6 extending perpendicularly to the plane of the comblike members, thus producing a structure which is suitable for stable amplifier operation with the +1 partial wave. Such a structure is represented in FIGS. 8 and 9, the latter figure showing a transverse section taken along lines A–B of FIG. 8.

Figure 11:
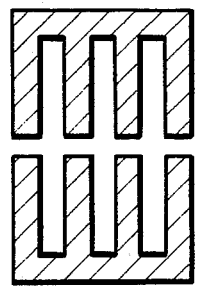
FIGS. 10 and 11 are sectional views of part of a delay line for operation as a multiple delay line.
Figure 10:
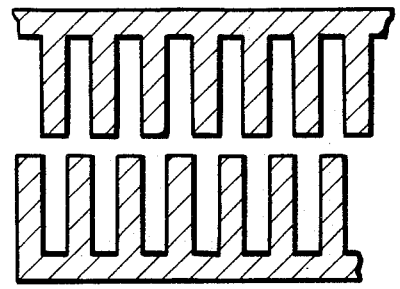

In order to provide for higher capacity or loading, the structure according to the invention can also be made as a multiple delay line as represented in FIGS. 10 and 11, the latter figure showing again a transverse section taken through FIG. 10. The line is provided with two inwardly facing structures each having four serially arranged and mutually interconnected comb-like members.

Figure 13:
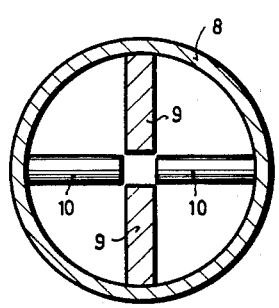
FIGS. 12 and 13 represent in sectional views part of a further delay line of modified structure.
Figure 12:
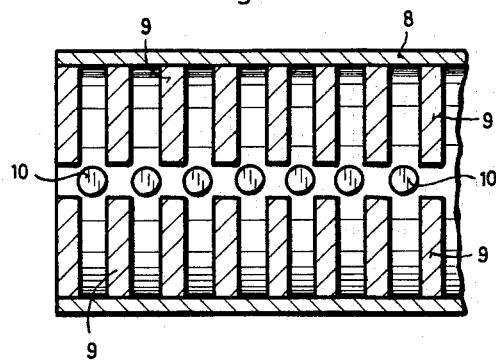

FIG. 12 is a longitudinal section and FIG. 13 a transverse section of a delay line comprising a wave guide 8 having teeth 9 and 10 extending from the wall thereof, such teeth being angularly displaced by 90° and forming together two oppositely disposed rows of teeth. These rows are mutually staggered longitudinally of the wave guide 8. This delay line accordingly represents a cylindrical formation of a stapled or stacked line with two pairs of comblike members.

Changes may be made within the scope and spirit of the appended claims which define what is believed to be new and desired to have protected by Letters Patent.

I claim:

1. A delay line for travelling wave tubes, especially for millimeter waves, constructed in the manner of a double-comb line, comprising two comblike members made wholly of metal and disposed in parallel relationship forming teeth which are free standing in the longitudinal direction of the delay line with the teeth of one member facing the teeth of the other member, said teeth lying in a common longitudinal plane, with the teeth of one member being mutually displaced in the longitudinal direction of the delay line relative to the teeth of the other member, the free ends of the teeth of the two comblike members being spaced apart transversely of the delay line, the dimension of the free ends of said teeth in the longitudinal direction of the delay line being at the most equal to the distance between the ends of adjacent teeth of a comb.

2. A delay line according to claim 1, wherein the extent of the respective teeth in longitudinal direction corresponds to the spacing between any two neighboring teeth.

3. A delay line according to claim 1 wherein the respective teeth are of trapezoidal cross section in said longitudinal direction.

4. A delay line according to claim 1, wherein said teeth are parts of comblike members which are disposed within a wave guide.

5. A delay line according to claim 1, wherein said teeth are alternately positioned opposite longitudinally extending walls of a wave guide.

6. A delay line according to claim 1, wherein said sets of teeth are parts of a stamped metal sheet which is soldered to walls of a wave guide.

7. A delay line according to claim 1, wherein said teeth are disposed in rows within a wave guide, two webs being also disposed within said wave guide, said webs extending longitudinally of said wave guide and symmetrically perpendicularly with respect to the planes of said teeth.

8. A delay line according to claim 1, comprising a plurality of sets of teeth greater than two, such teeth being interconnected in the manner of a stacked line.

References Cited by the Examiner

UNITED STATES PATENTS

| | | | |
|---|---|---|---|
| 2,567,748 | 9/1951 | White | 315—39 |
| 2,643,353 | 6/1953 | Dewey | 315—3.5 |
| 2,861,212 | 11/1958 | Lerbs | 315—3.6 |
| 2,888,595 | 5/1959 | Warnecke et al. | 315—3.5 |
| 2,888,598 | 5/1959 | Palluel | 315—3.6 |
| 2,933,639 | 4/1960 | Lally | 315—3.6 |
| 2,936,395 | 5/1960 | Everhart | 315—3.5 |
| 3,011,085 | 11/1961 | Caldwell | 315—3.5 |

FOREIGN PATENTS 944,500   11/1948   France.

HERMAN KARL SAALBACH, *Primary Examiner.*

RALPH G. NILSON, GEORGE N. WESTBY,
*Examiners.*

E. STRICKLAND, S. CHATMON, Jr.,
*Assistant Examiners.*